United States Patent [19]

Green

[11] 4,044,709
[45] Aug. 30, 1977

[54] OMNIDIRECTIONAL SPEED COCKPIT DISPLAY

[75] Inventor: David L. Green, Potomac, Md.

[73] Assignee: Pacer Systems, Inc., Burlington, Mass.

[21] Appl. No.: 617,590

[22] Filed: Sept. 29, 1975

[51] Int. Cl.² ............................................. G01D 7/04
[52] U.S. Cl. ............................ 116/129 F; 73/178 H;
                                     116/DIG. 43; 116/114 R
[58] Field of Search .......... 73/178 H, 178 R, 180, 189;
                       116/DIG. 43, 129 F, 117 D, 129 R, 114 R;
                                     340/27 SS, 27 NA, 27 R

[56] References Cited

U.S. PATENT DOCUMENTS

| | | | |
|---|---|---|---|
| 2,424,570 | 7/1947 | Jenks | 73/178 R |
| 2,567,212 | 9/1951 | Klopp | 73/178 H |
| 2,845,623 | 7/1958 | Iddings | 73/178 H |
| 3,048,836 | 8/1962 | Guarino | 73/178 H |
| 3,203,236 | 8/1965 | Prince | 73/189 |
| 3,228,281 | 1/1966 | Holt | 73/178 R |
| 3,277,484 | 10/1966 | Bostwick | 73/178 R |
| 3,292,176 | 12/1966 | Crane | 73/178 R |
| 3,355,733 | 11/1967 | Mitchell | 343/7.9 |
| 3,395,576 | 8/1968 | Kuiper | 73/178 R |
| 3,474,669 | 10/1969 | Carter | 73/189 |

*Primary Examiner*—S. Clement Swisher
*Assistant Examiner*—Denis E. Corr

[57] ABSTRACT

An omnidirectional cockpit display has perpendicular bars independently moving across a plate for providing indications of speed in lateral, forward and rearward directions. A zero point is centered between lateral edges of the plate and is displaced vertically from the center of the plate to provide greater speed indications in a forward direction than in a rearward direction. A safe flight envelope is indicated on the plate, extending around the zero point in lateral and rearward directions and extending toward the edges of the plate in the forward flight direction. Indicator scales are mounted along edges of the plate, and pointers move along the scales to indicate vector sum of component speeds, and density altitude. Other scales and pointers indicate ground speed in orthogonal directions, while the crossbars indicate air speed in those directions. Other peripheral scales and pointers indicate directional control position, collective thrust control position, rate of climb and rate of closure. Vector sum or absolute magnitude is indicated at all times. When the absolute speed exceeds the graphic capability of the display, the vector sum can be determined by viewing the pointer scale on the left side. Safe rotor engagement and disengagement envelopes are presented as a shaded area on the plate. On-off warning flags are provided around peripheries of the plate.

21 Claims, 6 Drawing Figures 4,044,709

OMNIDIRECTIONAL SPEED COCKPIT DISPLAY

BACKGROUND OF THE INVENTION

The Navy, Air Force and Coast Guard have used crossbar-type indicators to present doppler radar-derived ground speed cues to helicopter pilots. That is an inexpensive type indicator available in large quantities in the government supply system.

That indicator format provides the pilot with omnidirectional information. The intersection of the two bars tells the pilot which direction the helicopter is moving. A line between the intersection of the two bars and the zero speed point portrays the direction of travel of the craft. The bars of that type of indicator provide very strong visual cues which can provide useful piloting information even in a peripheral scan.

There are two approaches that are used when connecting speed sensors to bars of the indicators. In one approach, when forward speed is generated, the horizontal bar moves downscale, and when right sideward speed is generated the vertical bar moves to the left. That is the display technique that doppler installations have used for over 15 years.

There is a second approach which may be more desirable for Marine Corps and Army applications. In this alternative, the horizontal bar moves upscale to indicate forward speed, and the vertical bar moves to the right to indicate sideward flight toward the right.

Helicopter speed displays are found in U.S. Patent and Trademark Office in Class 73, Measuring and Testing, Sub-Class 178 H and in Class 116 Indicators, Sub-Class 129 and Digest 43. Examples of prior art are U.S. Pat. Nos. 2,567,212; 2,845,623; 3,048,836; 3,395,576; and 3,355,733.

SUMMARY OF THE INVENTION

The present invention provides a crossbar-type indicator of lateral and forward and rearward speeds with a zero point horizontally centered and displaced vertically to provide greater speed range indication in a forward direction. The face of the display is marked with omnidirectional limitations important to structural flight envelopes and controlability envelopes. There are a number of ways in which the face of the display is marked to show the envelopes. In one embodiment, a simple dash line is used to indicate a safe flight envelope for a particular helicopter. For example, a U-shaped marking, with the bottom of the "U" formed as a semicircle on a 30 knot radius about the zero point indicates that the helicopter should be limited to a 30 knot sidewind component in forward flight and indicates a clearance to turn 360° in a 30 knot wind.

Flight envelope by definition is the envelope of safe operating conditions. If the pilot is not given any way to know where he is, especially during night operations, he may unknowingly exceed his envelope causing unexpected craft operation.

When that happens, the pilot may conclude erroneously a control system failure. If the pilot senses a control system failure, he may well dump the aircraft on the ground or ship. That has happened, even during daylight operations. It often happens during takeoff in shifting winds such as during storms or during ship based operations.

When the flight envelope is exceeded, the result may well be an actual failure. Attack helicopter pilots may induce tail rotor system failures by using the tail rotor to skid the aircraft to the firing heading. Hover and slow speed towing operations, such as oil spill containment booms or mine sweeping devices, may cause tail rotor buzz, which may be responsible for heavy damage or loss of helicopters.

After pilots have had some bad downwind experiences they often become careful and apprehensive when they sense an unsafe downwind or crosswind situation. This apprehension is often evidenced by conflicts between flight operations personnel who want downwind operations, and pilots who feel downwind hovers violate a prudential rule of flight. In fact, much of the useful downwind envelope is not used because pilots prudently refuse to accept the risk associated with downwind and crosswind hovers, landings, or takeoffs. The present invention allows the pilot to associate aircraft capability limitations with airspeed in sideward-rearward flight in the same way all aviators normally do in forward flight.

All static, fatigue, and wear lives are based upon flight loads which in turn are directly relatable to flight envelopes. When flight envelopes are violated on a continual basis, cracks develop in skins and fittings and parts wear out early. The present invention provides a way to keep the aircraft within limits and know for record purposes when limits have been exceeded. With this invention, it is entirely possible to alter envelopes to improve craft maintainability while a fix is being engineered and produced.

If a pilot inadvertently attempts to fly outside the flight envelope, he may be prevented from doing so by a loss of directional control as yaw control limits are reached. This keeps the aircraft inside the envelope but represents an unacceptable situation from a weapons deployment standpoint. Precise heading control is paramount to most helicopter launched weapons. In addition, the temporary loss of heading control under conditions of poor external visibility may precipitate a yaw to roll to pitch couple that is not noted by the pilot and subsequently produces an unusual aircraft attitude with a spacially disoriented pilot at the controls. Thus, loss of heading control is not an acceptable warning that envelope limits are being exceeded.

If the pilot is able to fly outside of the flight envelope while maintaining adequate controllability, the result may well be an over-stressed aircraft. The out-of-limits operation may involve airframe structure, tail rotor blade fatigue, unusually high gearbox stresses or any other airframe component. This abuse may show up as a flight failure but most probably the overstress will be reflected as unexplained accelerated wear. Loads used to compute components wear were established while flying with reference to the handbook flight envelope.

Helicopter rotors must be engaged or disengaged within certain limitations of wind speeds and directions as the helicopter rests on the ground or on a ship. The relative wind data presented on the indicator can be observed before engagement and before rotor disengagement. On the indicator, the pilot can watch the wind which normally varies in velocity and engage or disengage the rotor at a low point in a gust pattern.

To avoid engagement of disengagement at unsafe wind conditions, the present invention employs a shaded, hash marked, or otherwise marked area on the instrument to indicate the safe wind envelope when the rotor may be engaged or disengaged. As long as the intersection of the crossbar wind indicators falls within the shaded area, rotor engagement or disengagement is safe. By staying within the limits of the shaded area one avoids overstressing the rotor system, blade to ground strikes, blade to airplane strikes and mass bumping. The present indicator allows the winds to be measured and the safe wind conditions to be assessed directly in the helicopter and tells the pilot whether the craft must be turned before the rotor can be engaged or disengaged. It allows the pilot to engage during low points in gusts within the limits or at the best obtainable conditions. The marking of a wind indicator plate with rotor engagement and disengagement envelopes is of further importance because it allows uniquely shaped envelopes to be presented. The wind speed and relative angle information which defines the actual safe envelope is too complex for use in the operational environment. Handbooks have presented simplified safe engagement envelopes which do not represent the actual acceptable envelope. The actual envelopes are larger at some relative wind angles than the present format suggests.

By placing the envelope directly on the indicator, the pilot may observe the gust situation with the indicator so that he may engage the rotor during periods of reduced wind as the crossbars recede within the envelope. Without that direct indication, the pilot would have to rely upon his own feeling and his knowledge of the average wind condition with the remembered envelope. Warning of high winds or wind shifts may come from ground support observation, but these are often too late to be useful.

The safe flight envelopes and the safe engagement and disengagement envelopes are placed on the plate of the instrument beneath the moving crossbars in a preferred embodiment. The envelopes may be represented on cards which overlie the base plates or on transparencies which are mounted in front of the crossbars. This includes a roller type face plate.

The envelopes may be indicated in outline form on the face of the plate. The safe flight envelope is presented in one form of the invention by bright dashed lines. The engagement-disengagement envelope is represented by less bright lines constructed for example with small dots. In an alternative form of the invention, the safe engagement envelope is represented by a shaded area. In one form of the invention the plate is opaque, and an envelope is represented by translucent pressures in the plate illuminated from the rear by a small lamp. In another form of the invention, the plate is translucent and the envelopes are indicated by opaque lines and shaded areas.

A safe flight envelope is often U-shaped with a curved rear section extending in a rearward flight-indicating direction and extending laterally from the zero point to indicate limited safe flight in rearward and sideward directions. Spaced parallel lines extend forward to edges of the plate to indicate that side components of relative wind should not be exceeded during forward flight.

The safe engagement envelope in one embodiment takes a form of a irregular shaped curve around the zero point with a pronounced extension in the forward direction.

The crossbars of the present indicator are moved in a conventional manner by linkage connected to voltmeter-type motion producers.

Scales are provided along edges of the plate, and pointers are moved along scales by similar driving arrangements. In a preferred embodiment of the invention, a scale has graduations of speed, and a moving pointer indicates the absolute flight pass speed or the vector sum of the x-y components. A scale and pointer along the bottom edge of the instrument indicate density altitude to apprise the pilot of maneuver capabilities at the current position of the helicopter.

In one embodiment of the invention, the scales and pointers indicate ground speed components from conventional doppler sources, while the crossbars indicate air speed. In another embodiment of the invention, the scale and pointer at the side indicate rate of climb or collective thrust control position, while the scale at the bottom indicates the directional control position, so that the pilot is immediately aware of the reserve control. The pointer at the bottom would indicate directional control remaining by being positioned at the extreme left extension to indicate full left pedal, indicating no left pedal control remaining. That embodiment of the invention is extremely important when using automatic heading holding systems. In that case full control may be reached and exceeded without warning.

In another embodiment of the invention, the scales and pointers indicate a prediction of speed change. The pointer drive includes means to assess the rate of change of speed in the particular direction and to add that rate to the existing speed. For example the pointer on the scale at the side of the indicator would point to the forward or reverse air speed which is predicted to exist in two or three seconds because of the current rate of change in forward or rearward speed. The pointer at the bottom scale would serve the same function for lateral air speeds.

In another embodiment of the invention, the pointer at the side scale is used to indicate the closure rate between the helicopter and the target, for example a landing site. The relative wind along the approach path is signaled to the helicopter. The helicopter crew than sets in a DC bias signal using a simple DC potentiometer, according to the speed of the wind. The pointer drive then compares the wind speed and speed of the helicopter, and it moves the pointer to indicate the closure rate. That allows pilots to adjust closure speed for variations in relative wind. For example, a closure speed of between zero and eighty knots may be indicated. Variations in relative wind from minus ten to plus forty knots change the closure problem considerably.

By setting in the wind, pilots are now able to fly closure rate on every approach without the need to compute closure rate in their head. Referencing closure rate directly makes it possible to obtain a more consistent mental picture of the approach and thereby to reduce the approach to a more standard profile. That enhances safety, reduces overruns, and reduces the number of missed glide slopes.

In a further embodiment of the invention, the pointer at the side indicates forward speeds. For example, the movement of the horizontal bar indicates velocities up to 60 knots, and pointers indicate velocities up to 200 knots. Preferably the side pointer indicates absolute velocity or the vector sum of velocity components.

One object of the invention is the provision of a helicopter cockpit omnidirectional speed display having horizontal and vertical crossbars positioned for movement across a plate in orthogonal directions, means connected to the frame and to the crossbars for independently moving the crossbars to indicate speed in lateral directions with the vertical crossbar and to indicate speed in forward and rearward directions with the horizontal crossbar, and a zero center indicator on the plate, with an improvement of the zero indication being centered horizontally on the plate and being ofsett vertically on the plate to provide a greater range of speed indications in a forward direction than in a backward direction.

Another object of the invention is the provision of a cockpit omnidirectional speed display having a safe flight envelope indication mounted on a plate around a zero indication for indicating safe speeds in lateral and rearward directions.

A further object of the invention is the provision of an omnidirectional speed cockpit display with a safe flight envelope indication, for example a U-shape, having parallel sides and a semicircular bottom centered on a zero indication, or any shape which matches the actual flight envelope of various aircraft. The flight envelope may be irregular.

A further object of the invention is the provision of an omnidirectional speed cockpit display having an indicator scale mounted along an edge of the plate and a pointer mounted opposite the scale, wherein the scale has graduations of vector speed sumation and the pointer indicates the vector speed on the scale.

Another object of the invention is the provision of an omnidirectional speed cockpit display indicator scale mounted along an edge of the plate and a pointer mounted opposite the scale, wherein the scale has graduations of density altitude and the pointer indicates density.

Another object of the invention is the provision of a cockpit display having indicator scale and a pointer mounted opposite the scale, wherein the scale has graduations of directional control remaining, and the pointer indicates directional control remaining.

A further object of the invention is the provision of an omnidirectional speed cockpit display having an indicator scale and a pointer mounted opposite the scale, wherein the scale has graduations of predicted speed change, and the pointer indicates the predicted future speed in a finite, predetermined time period.

Another object of the invention is the provision of an omnidirectional speed cockpit display having an indicator scale and a pointer mounted opposite the scale, wherein the scale has graduations of closing rate, and further comprising bias means connected to the pointer-moving means for selecting a bias according to known wind conditions, whereby the pointer indicates rate of closing on a target.

A further object of the invention is the provision of an omnidirectional speed cockpit display having crossbars moving across a plate and having an indicator scales mounted along edges of the plate, pointers mounted opposite the scale, wherein the bars move according to ground speed, and wherein the pointers move according to air speed, or vice versa.

A further object of the invention is the provision of a cockpit omnidirectional speed display having a safe rotor engagement and disengagement envelope indicated on a plate around a zero indication for indicating safe speeds in lateral, rearward and forward directions for engaging and disengaging the rotor.

These and further objects of the invention are apparent in the disclosure which includes the above and following specifications with the claims and the drawings.

DETAILED DESCRIPTION OF THE DRAWINGS

Figure 1:
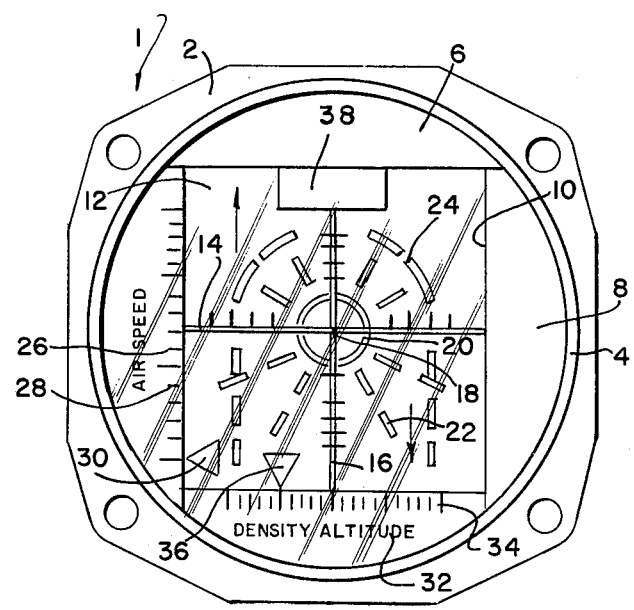
FIG. 1 is a front view of a face of an omnidirectional speed cockpit display showing an offset zero point in a safe flight envelope, and showing a vector sum scale and pointer and a density altitude scale and pointer.

Referring to the drawings, an omnidirectional speed cockpit display is generally indicated by the numeral 1 in FIG. 1. The display instrument 1 has a frame 2 on which a rearward extending cylindrical casing 4 is mounted to enclose the voltmeters and linkage-type drives for the crossbars and pointers. The front of frame 2 is closed by a window 6. Beneath the window 6 a portion 8 of the frame conceals the driving apparatus and mounts scales. Through a square opening 10 in the frame, the face of a plate 12, crossbars 14 and 16 move to indicate orthogonal directional components of speed.

Horizontal crossbar 14 moves downward to indicate relative wind from a forward direction and/or craft movement in a forward direction. Upward movement of crossbar 14 indicates relative wind from a rearward direction and/or movement in a rearward direction. Movement of vertical bar 16 to the left indicates movement of the craft to the right and/or a relative wind coming from the right. Movement of vertical crossbar 16 to the right indicates craft movement to the left and/or relative wind coming from a left direction. The zero point 18 which is the center of a large circle 20 is offset upward in safe flight envelope 24 on plate 12 so that a greater provision is made for indications of speed in a forward direction. The plate is marked with graduations from the zero point to indicate velocity increments. For example, the circle 20 indicates 10 knots and the next outward mark in any direction indicates 20 knots. Radii are provided in dashed lines 22 at 30° intervals to make headings of relative winds easily discernible as an intersection of the crossbars moves away from the zero point. These marks also provide texture on the display face so that bar location and bar movement can be easily detected.

A safe flight envelope indication 24 is provided on the face of plate 12. The safe flight envelope in one form is a generally U-shape curve. As long as the intersection of the crossbars remains within that curve, the helicopter is operating in its safe flight envelope. For example, the curve showing in the drawing indicates that the helicopter should not operate with a crosswind component exceeding forty knots and should not operate with a rearward wind exceeding forty knots. The safe flight envelope shown in FIG. 1 is a U-shaped curve having a semi-circular portion centered on the zero point and extending laterally and rearward from the zero point and having parallel legs which extend in a forward direction from ends of the U-shaped portion.

In a preferred embodiment of the invention, the cockpit display is provided wih a scale 26 along one vertical edge of opening 10. The scale 26 has graduations 28 indicating vectoral sum of speeds. A pointer 30 is driven by a voltmeter and link-type drive within case 4. Pointer 30 indicates on scale 26 the vector sum of the orthogonal x-y components of airspeed as shown by the crossbars.

In the preferred embodiment, a density altitude scale 32 is provided along the bottom edge of opening 10, and the scale has graduations 34 of density altitudes. For example, the preferred scale has graduations from minus 4 to plus 15 which indicate density altitudes in thousand feed from minus 4000 feet D.A. to plus 15000 feet D.A. Pointer 36 is shown indicating the zero point of density altitude. Pointer 36 is driven by a voltmeter, link-type drive as is conventional in similar instruments.

As further shown in FIG. 1, the instrument is provided with one or more brightly colored warning flags 38 which indicate system malfunction such as loss of power.

Figure 2:
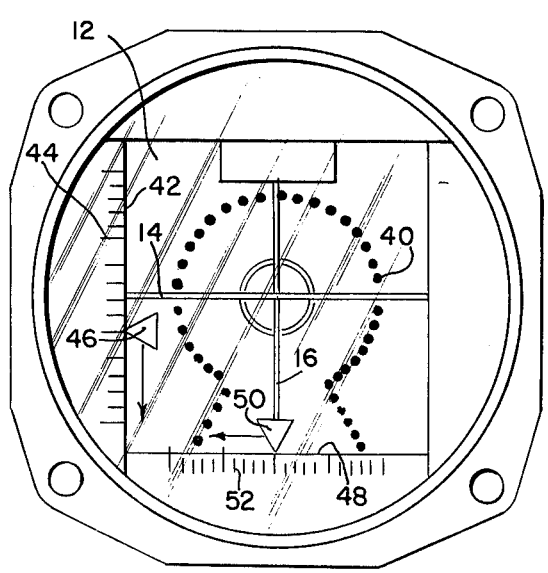
FIG. 2 represents the indicator face on which a rotor engagement and disengagement envelope is indicated, and on which collective thrust control and directional control are indicated.

Referring to FIG. 2, a safe rotor engagement and disengagement envelope 40 is indicated on the face of plate 12. The safe flight envelope 40 is an irregular curve substantially centered around the zero point and extended in a forward (downward) direction. In the present case the curve is shortened in the rearward direction and extends somewhat farther in the sideward direction and substantially farther in the forward direction. Disengaging or engaging rotors is safe when the crossbar intersection is within the engagement envelope 40. Because the crossbars are moved by wind, they of course operate when the helicopter is on the ground or on a ship. During gusting conditions, the pilot may see when the crossbars are well within the safe engagement envelope and may see when it is necessary to turn the helicopter or the ship so that the crossbar intersection will occur in an appropriate area of the safe engagement envelope.

Preferably, the safe flight envelope 24 is indicated in a bright color on the instrument, while the safe engagement envelope may be indicated as a shaded area or as an area bounded with discernible dots or other indications which make the envelope readily perceivable on face 12. While the safe flight envelope and safe engagement envelope have been shown independently for purposes of clarity, both envelopes appear on the same instrument face plate 12.

As shown in FIG. 2 scale 42 and graduations 44 are used with pointer 46 in the alternate form of the invention to indicate collective (thrust) control position. Scale 48 has graduations 52 along which pointer 50 moves to indicate directional control position. By quickly glancing at pointers 46 and 50, the helicopter pilot can ascertain the amount of collective control being used and remaining and the amount of directional control in a particular direction that is being used and remains. Pointers 46 and 50 are shown in their zero positions.

Figure 3:
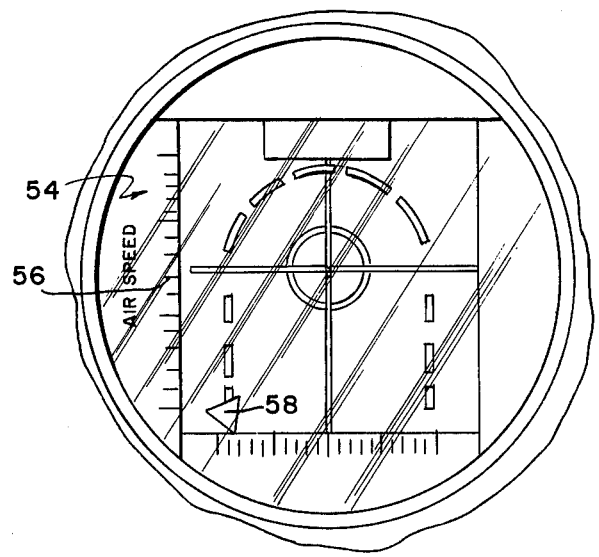
FIG. 3 is a display similar to FIG. 1 in which additional forward speed is indicated on a lateral scale.

In the embodiment of FIG. 3 the scale 54 shows vectoral speeds of the helicopter. In the present case, the crossbars indicate speeds of up to 40 knots in a rearward direction, fifty knots in a sideward direction, and 60 knots in a forward direction. Pointer 58 begins to move along scale 56 when the vectoral sum of airspeeds above 40 knots are measured. Pointer 58 continues upscale until a maximum of 190 knots.

Figure 4:
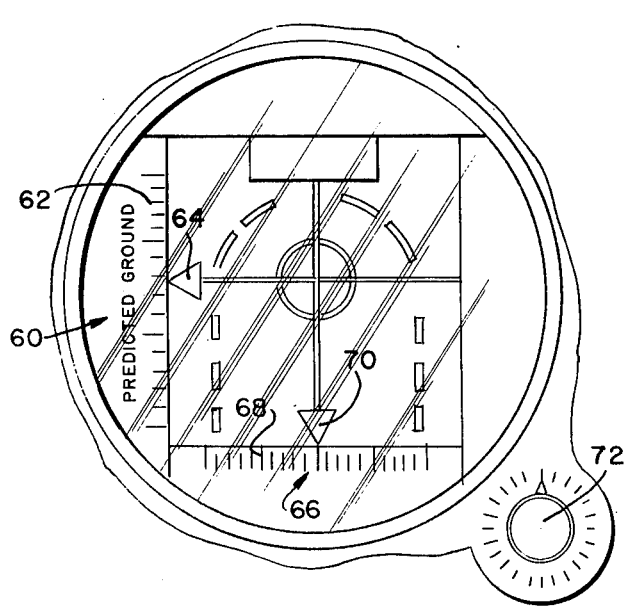
FIG. 4 is a representation of display in which forward and reverse and lateral components of ground speed are indicated and in which predicted speed components are indicated.

With reference to FIG. 4, speed scale 60 and 66 have graduations 62 and 68 which have zero points at zero points of the respective crossbars. Pointer 64 moves along scale 60 to indicate the predicted speeds in forward and reverse directions and pointer 70 moves along scale 66 to indicate predicted speeds in lateral directions.

One embodiment of the invention displays ground speed on the bars and airspeed on the pointers. A selector 72 is provided to select either a predicted speed or ground speeds to be displayed on the scales 66 and 60. When the ground speed position is selected, pointers 64 and 70 are controlled by conventional doppler ground speed measuring or computing device upwards, and the pointers display the ground x-y components of ground speed. The pilot may then compare the ground speed with the air speed components indicated by the moving crossbars. When the predicted speed position is selected by knob 72, the pointers move along the scales to indicate predicted X-Y speed components in the 2 or 3 second interval based on current rate of change of speeds.

Figure 5:
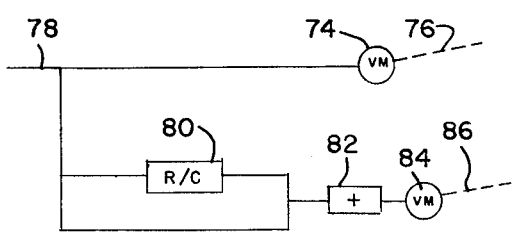
FIG. 5 is a schematic detail of apparatus for predicting air speed according to rate of change of speed.

As shown in FIG. 5 a conventional voltmeter 74 has a mechanical linkage drive 76 connected to a crossbar for moving the crossbar according to inputs from speed measuring equipment on line 78. Voltage from line 78 also is applied to a conventional rate of change measuring device 80, and the outputs of the rate of change device and lines 78 are summed in a conventional device 82 and applied to a voltmeter 84 for driving a mechanical linkage 86 connected to pointer 64 or pointer 70.

Figure 6:
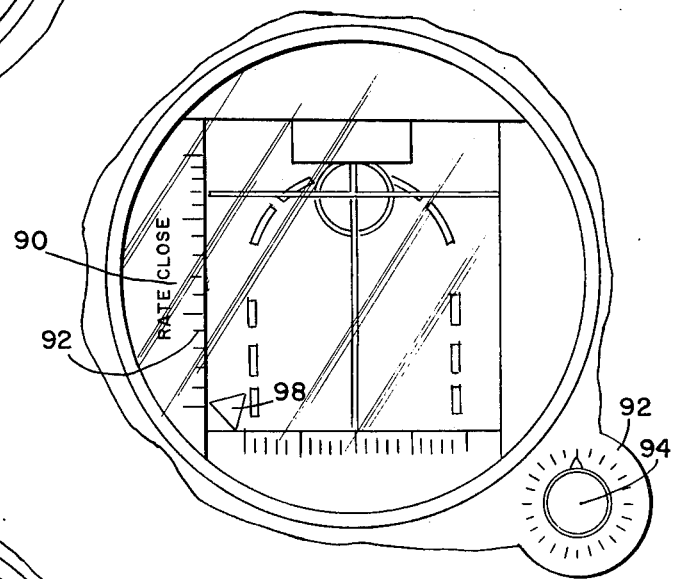
FIG. 6 is a cockpit display with a scale showing rate close with a destination point.

As shown in FIG. 6, in an alternate form of the instrument, a scale 90 is provided to indicate rate of close with a destination. A conventional potentiometer 92 is controlled by a knob 94 so that the pilot may input the wind speed at the destination. Graduations 92 on scale 90 indicate in ten knot increments the vector sum of the helicopter air speed component less the relative wind at the destination for indicating rate of close with the destination.

While the invention has been described with reference to specific embodiments, it will be obvious to those skilled in the art that modifications and variations of the invention may be constructed without departing from the scope of the invention. The scope is defined in the following claims.

I claim:

1. Helicopter cockpit omnidirectional display comprising an indicator having a frame for mounting on an instrument panel, a window connected to the frame for viewing indicator movements, a plate mounted on the frame behind the window, a first horizontal crossbar and a second vertical crossbar positioned between the plate and the window for movement across the plate in orthogonal directions, means connected to the crossbars for independently moving the crossbars to indicate speeds in lateral directions with the vertical crossbar and in forward and rearward directions with the horizontal crossbar, and a zero center indicator on the plate, the improvements comprising a zero indication being centered horizontally on the plate and being offset vertically on the plate to provide a greater range of speed indications in a forward direction than in a backward direction.

2. The cockpit display of claim 1 further comprising a safe flight envelope indication mounted on the plate around the zero indication for indicating safe speeds in lateral and rearward directions.

3. The cockpit display of claim 1 wherein the safe flight envelope indication is generally a U-shaped indication having parallel sides and a semicircular vertical extremity and wherein the semicircular extremity is centered on the zero indication.

4. The cockpit display of claim 1 further comprising a helicopter characteristic envelope indication on the plate spaced from the zero center indication for indicating when operations of a helicopter may be safely conducted.

5. The cockpit display of claim 4 wherein the envelope indication comprises a safe flight envelope indication.

6. The cockpit display of claim 5 wherein the envelope indication comprises a safe rotor engagement-disengagement envelope indication.

7. The cockpit display of claim 1 further comprising an indicator scale mounted between the plate and the window along an edge of the plate, a pointer mounted opposite the scale between the plate and window, and moving means connected to the pointer, wherein the scale has graduations of vector speed sumation and the pointer indicates the vector speed on the scale.

8. The cockpit display of claim 1 further comprising an indicator scale mounted between the plate and the window along and edge of the plate, a pointer mounted opposite the scale between the plate and window, and moving means connected to the pointer, wherein the scale has graduations of density altitude and the pointer indicates density altitude.

9. The cockpit display of claim 1 further comprising an indicator scale mounted between the plate and the window along an edge of the plate, a pointer mounted opposite the scale between the plate and window, and moving means connected to the pointer, wherein the scale has graduations of directional control remaining, and the pointer indicates directional control remaining.

10. The cockpit display of claim 1 further comprising an indicator scale mounted between the plate and the window along an edge of the plate, a pointer mounted opposite the scale between the plate and window, and moving means connected to the pointer, wherein the scale has graduations of predicted speed change and the pointer indicates the predicted future speed in a finite, predetermined time period.

11. The cockpit display of claim 1 further comprising an indicator scale mounted between the plate and the window along an edge of the plate, a pointer mounted opposite the scale between the plate and window, and moving means connected to the pointer, wherein the scale has graduations of closing rate and further comprising bias means connected to the moving means for selecting a bias according to known wind conditions, whereby the pointer indicates rate of closing on a target.

12. The cockpit display of claim 1 further comprising an indicator scale mounted between the plate and the window along an edge of the plate, a pointer mounted opposite the scale between the plate and the window, and moving means connected to the pointer, wherein the means to move the bars include input means for moving the bars according to one of ground speed and airspeed, and wherein the pointer moving means comprises means to move the bar pointer according to the other of ground speed and airspeed.

13. Helicopter cockpit omnidirectional display comprising an indicator having a frame for mounting on an instrument panel, a window connected to the frame for viewing indicator movements, a plate mounted on the frame behind the window, a first horizontal crossbar and a second vertical crossbar positioned between the plate and the window for movement across the plate in orthogonal directions, means connected to the crossbars for independently moving the crossbars to indicate speeds in lateral directions with the vertical crossbar and in forward and rearward directions with the horizontal crossbar, and a zero center indicator on the plate, the improvements comprising a zero point indication on the plate at an indication of the crossbars in an at rest condition, and an envelope display for indicating limits of safe helicopter operations, the envelope display being on the plate around the zero indication and spaced laterally and in a rearward direction for a predetermined amount away from the zero point and extending outward to the edge of the plate in a forward indicating direction.

14. The omnidirectional display of claim 13 wherein the operation envelope display comprises a safe flight envelope indication.

15. The omnidirectional display of claim 13 wherein the operation envelope display comprises a rotor engaging-disengaging envelope indication.

16. Helicopter cockpit omnidirectional display comprising an indicator having a frame for mounting on an instrument panel, a window connected to the frame for viewing indicator movements, a plate mounted on the frame behind behind the window, a first horizontal crossbar and a second vertical crossbar positioned between the plate and the window for movement across the plate in orthonormal directions, means connected to the frame and to the crossbars for independently moving the crossbars to indicate speeds in lateral directions with the vertical crossbar and in forward and rearward directions with the horizontal crossbar, and a zero center indicator on the plate, the improvements comprising first and second scales mounted between the window and the plate at perpendicularly related edges of the plate, at least one pointer mounted adjacent at least one of the scales and pointer moving means connected to the pointer independent of the crossbars to move the pointer over the scale, wherein the pointer moving means comprises summation means for indicating vectoral sum of speeds in lateral and forward and rearward directions.

17. The cockpit display of claim 16 wherein the pointer moving means comprises rate of change means having an input connected to the bar moving means, whereby a second pointer indicates predicted speed on the scale.

18. The cockpit display of claim 16 wherein the pointer moving means includes wind biasing means having an input of wind speed for indicating on the second scale closure speed with a target.

19. The cockpit display of claim 16 wherein a second scale has graduations of density altitude and further comprising a pointer mounted between the plate and the second scale and a second pointer moving means connected to the second pointer, the second pointer moving means including means for measuring density altitude.

20. The cockpit display of claim 16 wherein the pointer driving means comprises means to drive the pointer after the forward air speed exceeds a predetermined level, whereby the pointer indicates air speed above that level.

21. The cockpit display of claim 16 further comprising graduations on the second scale for indicating directional control remaining, a second pointer mounted adjacent the second scale, and second moving means for driving the second pointer, the second pointer moving means including a directional flight control input.

* * * * *